(12) United States Patent
Tellier et al.

(10) Patent No.: US 11,243,739 B2
(45) Date of Patent: Feb. 8, 2022

(54) COMPUTER-IMPLEMENTED TOOLS AND METHODS FOR GESTURE SUBSCRIPTION

(71) Applicant: Bose Corporation, Framingham, MA (US)

(72) Inventors: Daniel Winchell Tellier, Pepperell, MA (US); Christopher Gindel, Winchester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/881,887

(22) Filed: May 22, 2020

(65) Prior Publication Data

US 2020/0371739 A1 Nov. 26, 2020

Related U.S. Application Data

(60) Provisional application No. 62/852,809, filed on May 24, 2019.

(51) Int. Cl.
*G06F 3/16* (2006.01)
*G06T 11/00* (2006.01)
*G06F 3/01* (2006.01)

(52) U.S. Cl.
CPC ............... *G06F 3/16* (2013.01); *G06F 3/015* (2013.01); *G06T 11/00* (2013.01)

(58) Field of Classification Search
CPC . G06F 3/16; G06F 3/017; G06F 3/015; G06F 2111/18; G06F 3/0481; G06F 3/04817; G06F 9/443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 2014/0201666 A1* | 7/2014 | Bedikian | G06F 3/04815 715/771 |
| 2015/0261318 A1* | 9/2015 | Scavezze | G06F 3/017 345/158 |
| 2020/0264835 A1* | 8/2020 | Reily | G10L 15/22 |
| 2020/0371739 A1* | 11/2020 | Tellier | G06F 3/16 |

* cited by examiner

*Primary Examiner* — Todd Buttram
(74) *Attorney, Agent, or Firm* — Bond, Schoeneck & King, PLLC

(57) ABSTRACT

A computer program product and method for sending sensor data, the computer program product including a set of non-transitory computer readable instructions stored on a memory and executable by a processor, the set of non-transitory computer readable instructions arranged to: obtain gesture data from at least one sensor of a first wearable audio device; determine a first gesture from the gesture data; and, assign the first gesture to a device-agnostic gesture comprising at least one of: an Augmented Reality (AR) input variable, an affirmative input variable, or a negative input variable.

16 Claims, 10 Drawing Sheets

| AR Input Variable 180 | Double Tap 186 |
|---|---|
|  | Touch & Hold 188 |
| Affirmative Input Variable 182 | Head Nod 190 |
| Negative Input Variable 184 | Head Shake 192 |

Fig. 5

COMPUTER-IMPLEMENTED TOOLS AND METHODS FOR GESTURE SUBSCRIPTION

CROSS REFERENCE TO RELATED APPLICATIONS

This application claims priority to U.S. Provisional Patent Application Ser. No. 62/852,809, filed on May 24, 2019 and entitled "Computer-Implemented Tools and Methods for Gesture Subscription," the entirety of which is incorporated herein by reference.

BACKGROUND

The present disclosure relates generally to audio and peripheral devices, and more particularly to computer implemented tools and methods for sending and receiving data between and among audio and peripheral devices.

SUMMARY OF THE DISCLOSURE

The present disclosure relates to computer implemented tools and methods for providing a gesture subscription service for wearable audio devices.

In one aspect there is provided a computer program product comprising a set of non-transitory computer readable instructions stored on a memory and executable by a processor. The set of non-transitory computer readable instructions arranged to: obtain gesture data from at least one sensor of a first wearable audio device; determine a first gesture from the gesture data; and, assign the first gesture to a device-agnostic gesture comprising at least one of: an Augmented Reality (AR) input variable, an affirmative input variable, or a negative input variable.

In an aspect, the set of non-transitory computer readable instructions are arranged to: assign the first gesture to the AR input variable and the affirmative input variable.

In an aspect, the set of non-transitory computer readable instructions are arranged to: assign the first gesture to the AR input variable and the negative input variable.

In an aspect, the set of non-transitory computer readable instructions are arranged to: determine the first gesture, a second gesture, and a third gesture, from the gesture data; assign the first gesture to the AR input variable; assign the second gesture to the affirmative input variable; and, assign the third gesture to the negative input variable.

In an aspect, the at least one sensor can be selected from: a gyroscope, an accelerometer, and a magnetometer.

In an aspect, the at least one sensor can be selected from: a touch-capacitive sensor, a piezo-electric sensor, a mechanical sensor, a pressure sensor, and a deformation sensor.

In an aspect, the at least one sensor can be selected from: an Electrooculography (EOG) sensor, an Electromyography (EMG) sensor, an Electrocardiogram (EKG/ECG) sensor, and an electrically active film.

In an aspect, the first gesture is selected from: a swipe gesture, a tap gesture, a double-tap gesture, a head nod, a head shake, and a touch and hold gesture.

In one aspect there is provided a method of assigning gestures to input variables. The method comprises: obtaining gesture data from at least one sensor of a first wearable audio device; determining a first gesture from the gesture data; and, assigning the first gesture to a device-agnostic gesture comprising at least one of: an Augmented Reality (AR) input variable, an affirmative input variable, or a negative input variable.

In an aspect, the method further comprises: assigning the first gesture to the AR input variable and the affirmative input variable.

In an aspect, the method further comprises: assigning the first gesture to the AR input variable and the negative input variable.

In an aspect, the method further comprises: determining the first gesture, a second gesture, and a third gesture, from the gesture data; assigning the first gesture to the AR input variable; assigning the second gesture to the affirmative input variable; and, assigning the third gesture to the negative input variable.

In an aspect, the at least one sensor can be selected from: a gyroscope, an accelerometer, and a magnetometer.

In an aspect, the at least one sensor can be selected from: a touch-capacitive sensor, a piezo-electric sensor, a mechanical sensor, a pressure sensor, and a deformation sensor.

In an aspect, the at least one sensor can be selected from: an Electrooculography (EOG) sensor, an Electromyography (EMG) sensor, an Electrocardiogram (EKG/ECG) sensor, and an electrically active film.

In an aspect, the first gesture is selected from: a swipe gesture, a tap gesture, a double-tap gesture, a head nod, a head shake, and a touch and hold gesture.

These and other aspects of the various implementations will be apparent from and elucidated with reference to the implementation(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various implementations.

FIG. 5 illustrates device-agnostic gesture variables.

DETAILED DESCRIPTION

The present disclosure relates to computer implemented tools and methods for providing a gesture subscription service for wearable audio devices.

Figure 1:
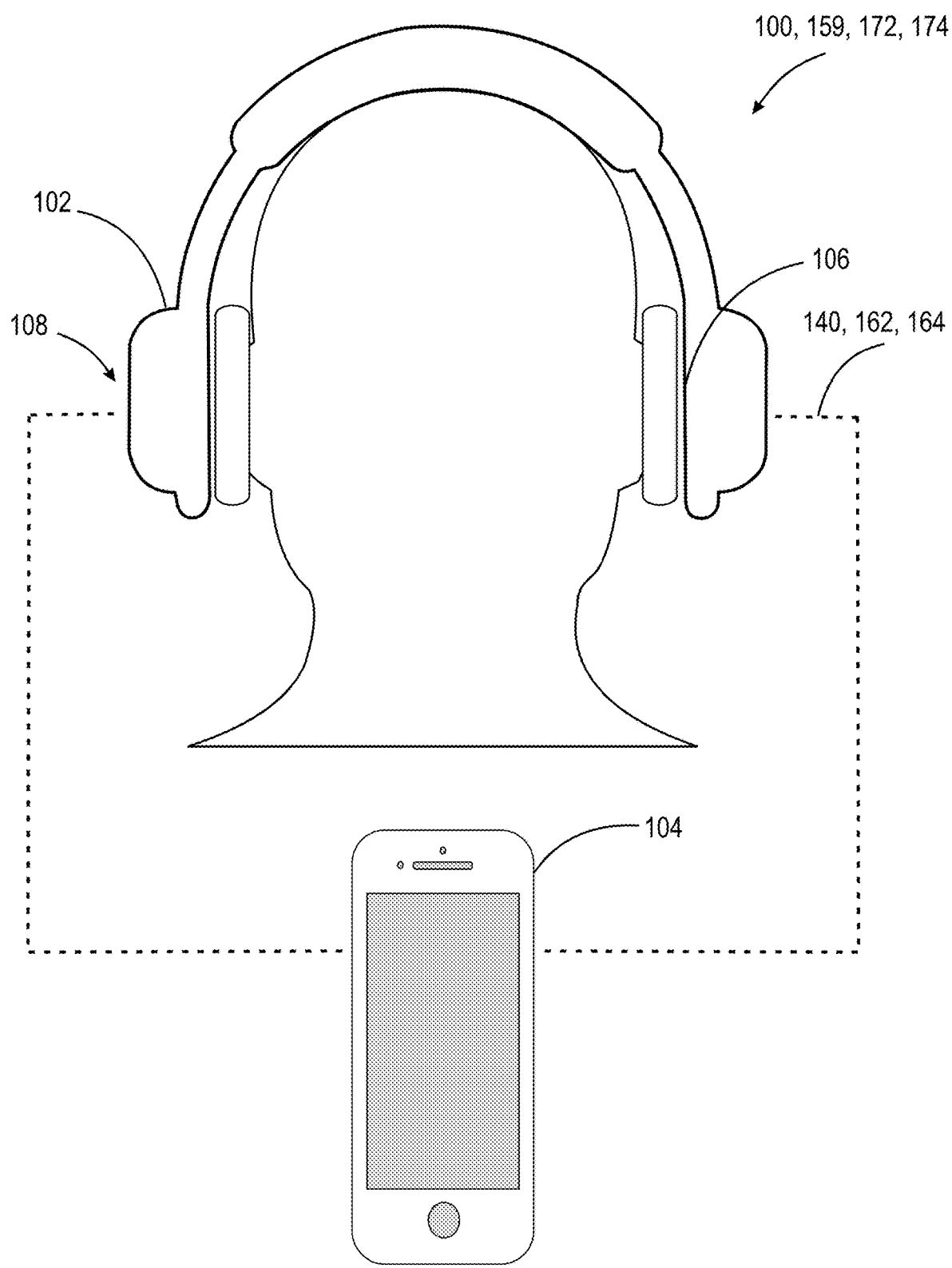
FIG. 1 is a schematic view of an audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcup (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an around-ear headset, in other examples the headset may be an in-ear, on-ear, or near-ear headset. In some examples, a wearable audio device may be an open-ear device that includes an acoustic driver to radiate acoustic energy towards the ear while leaving the ear open to its environment and surroundings.

The following description should be read in view of FIGS. 1-4B. FIG. 1 is a schematic view of audio system 100 according to the present disclosure. Audio system 100 includes a first wearable audio device 102 and first peripheral device 104 discussed below. Although illustrated in FIG. 1 as over-ear headphones, it should be appreciated that first wearable audio device 102 could be any type of headphone or wearable device capable of establishing a wireless or wired data connection with first peripheral device 104.

Figures 2A, 2B:
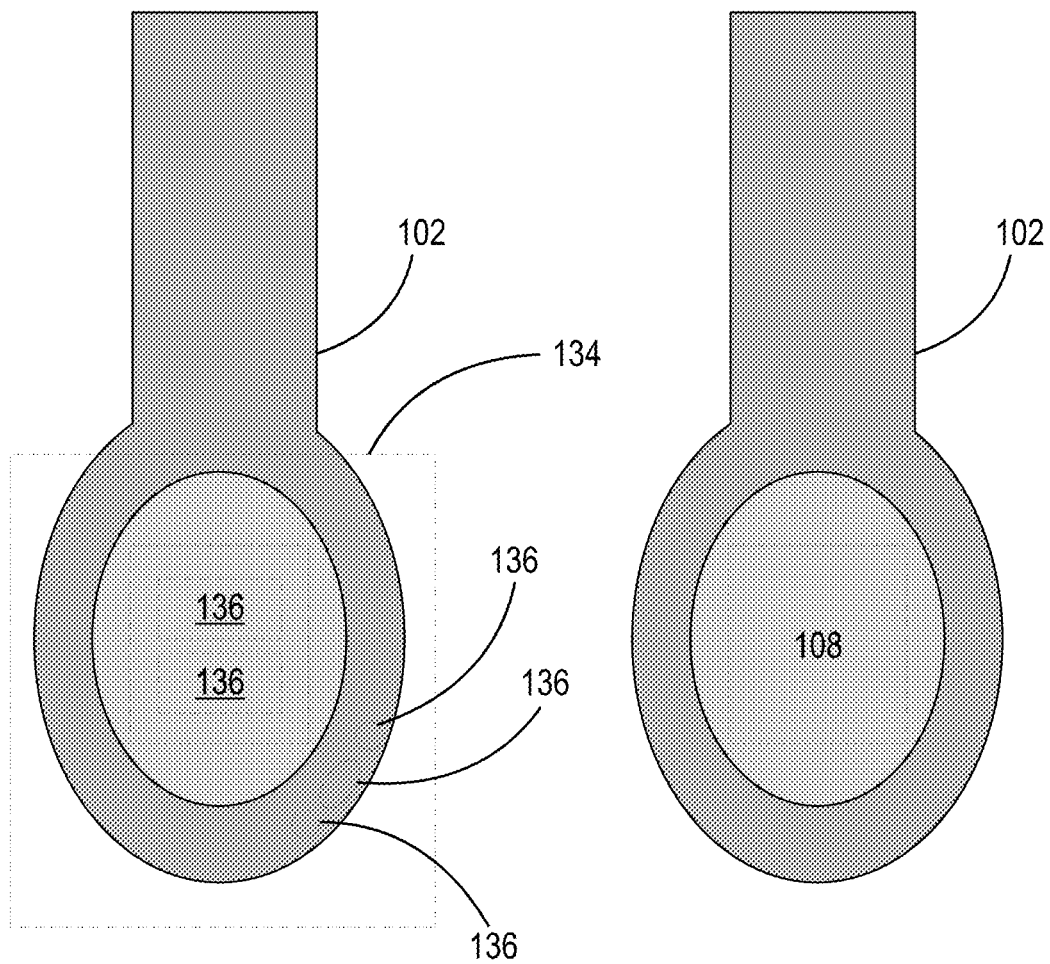
FIG. 2A is a right-side perspective view of a wearable audio device according to the present disclosure.
FIG. 2B is a left-side perspective view of a wearable audio device according to the present disclosure.
Figure 4A:
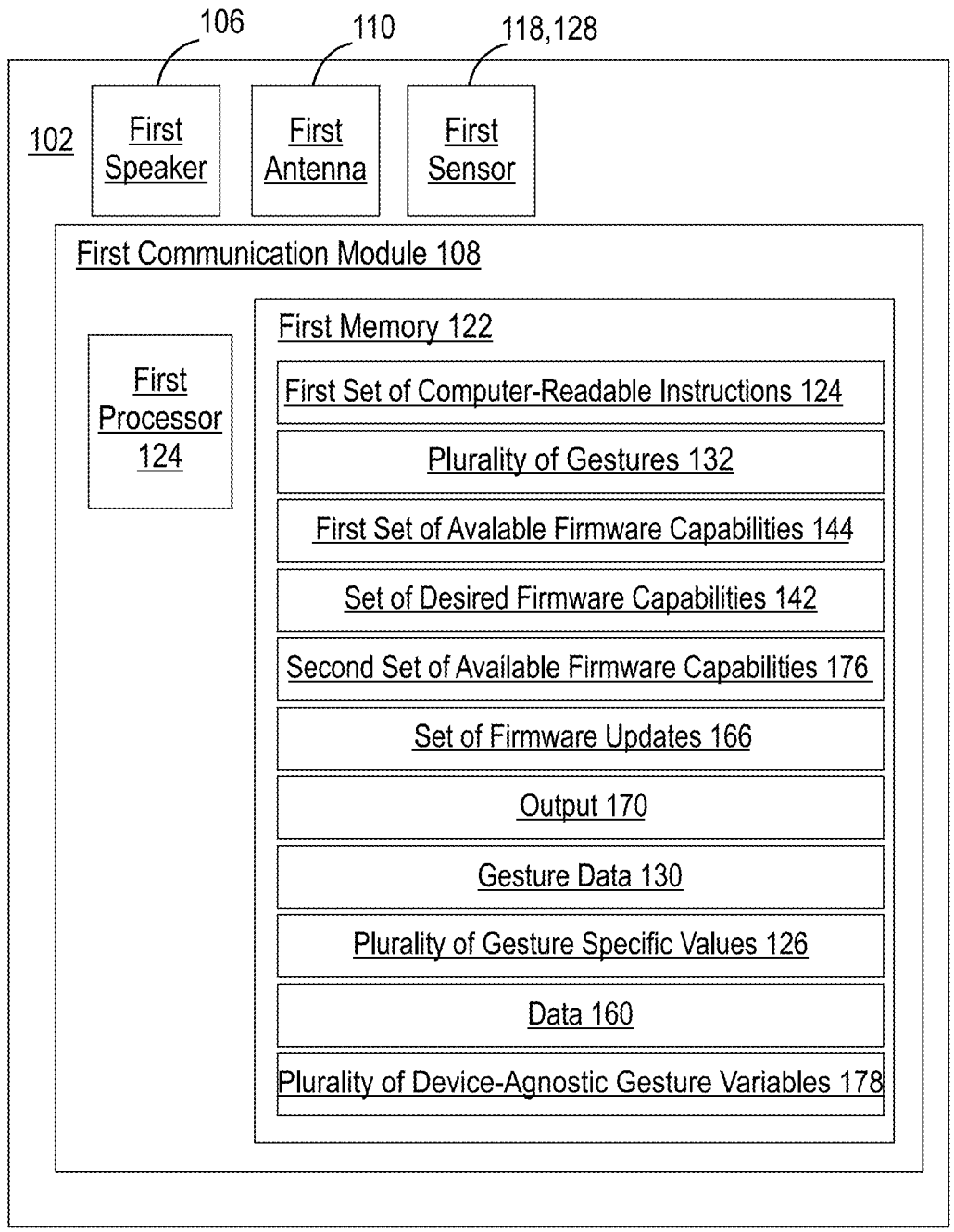
FIG. 4A is a schematic view of the electronic components of a wearable audio device according to the present disclosure.
Figure 4B:
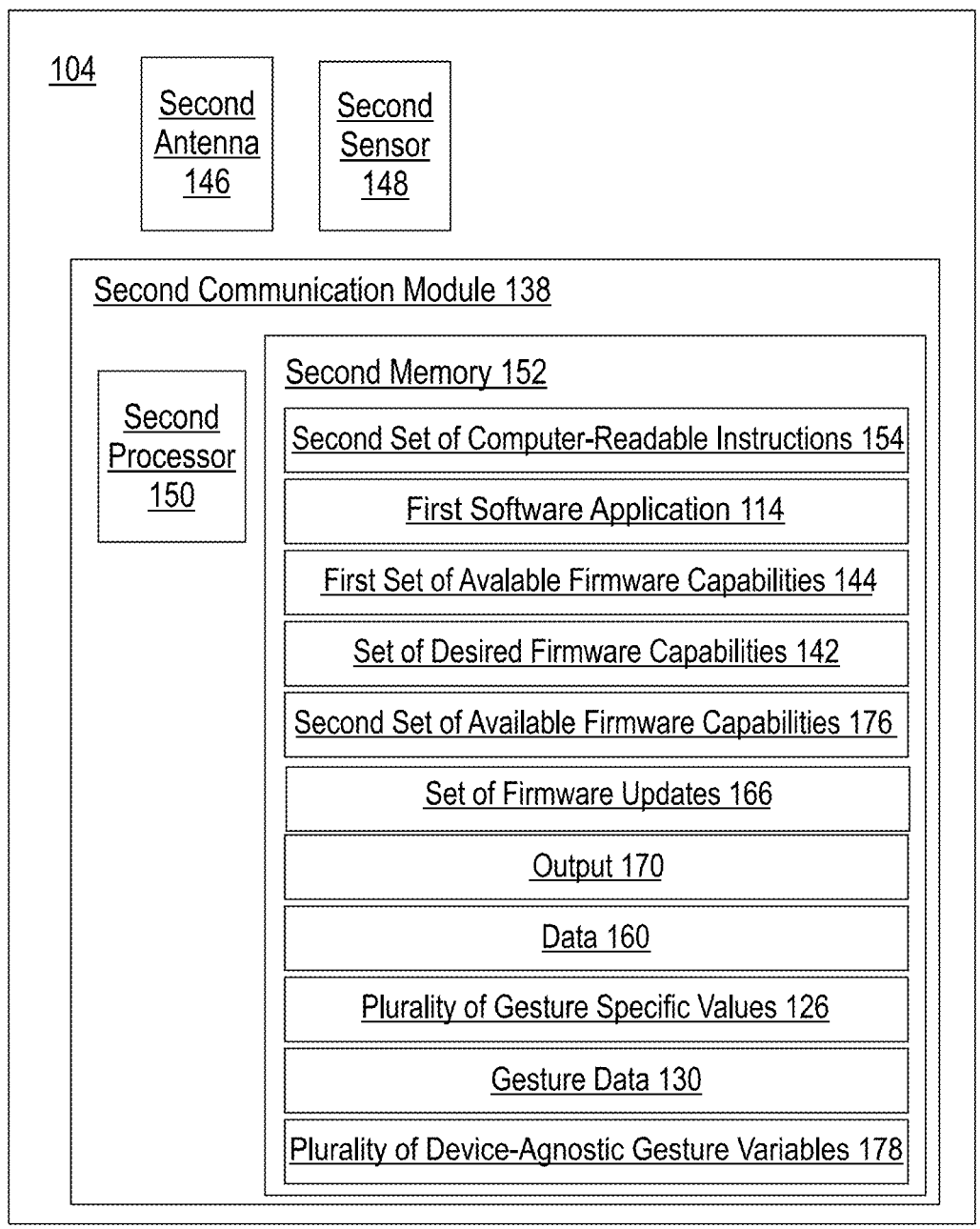
FIG. 4B is a schematic view of the electronic components of a peripheral device according to the present disclosure.

First wearable audio device 102 includes first speaker 106 and first communication module 108 (shown in FIGS. 2B and 4A). First speaker 106 (shown in FIG. 4A) is arranged to produce a first audio signal proximate at least one ear of a user in response to audio data sent and/or received from first communication module 108. First communication module 108 is arranged to send and/or receive data from an antenna, e.g., first antenna 110 as shown in FIG. 4A. The data sent or received can be, for example, audio data or communication data sent and/or received from at least one of a plurality of external devices (e.g., first peripheral device 104), data sent and/or received regarding the set of desired firmware capabilities 142 of a first software application 114 running on first peripheral device 104 (discussed below), data sent and/or received regarding the first set of available firmware capabilities 144 of first wearable audio device 102 (discussed below), and sensor data 118 (discussed below). It should be appreciated that first communication module 108 can be operatively connected to first processor 120 (shown in FIG. 4A) and first memory 122 (shown in FIG. 4A), where the first processor 120 and the first memory 122 are operatively arranged to execute and store, respectively, a first set of non-transitory computer-readable instructions 124 (shown in FIG. 4A). It should also be appreciated that, although not illustrated, first wearable audio device 102 may include a battery or other power source capable of providing electrical power to the various electronic components discussed above. First set of non-transitory computer-readable instructions 124 may include instructions related to a software application, e.g., first software application 114 (discussed below).

Furthermore, first wearable audio device 102 includes a first sensor 128 (shown in FIG. 4A) arranged on or within first wearable audio device 102. First sensor 128 can be selected from: a gyroscope, an accelerometer, a magnetometer, a touch-capacitive sensor, a piezo-electric sensor, a mechanical sensor, an audio receiver, a pressure or deformation sensor, an Electrooculography (EOG) sensor, an Electromyography (EMG) sensor, an Electrocardiogram (EKG/ECG) sensor, and an electrically active film. First sensor 128 is arranged to obtain gesture data 130 (schematically shown in FIG. 4A) corresponding to at least one gesture of a plurality of gestures 132. A non-limiting list of gestures of plurality of gestures 132 includes: a swipe gesture, a tap gesture, a double-tap gesture, a head nod, a head shake, a touch and hold gesture, a smile; a frown; a wink or blink; eye movement (e.g., movement of eyes back and forth or up and down); an eyebrow raise; a clenching of a user's jaw; movement of a user's jaw forward, backward, or to one side; raising of a user's ears; an opening of a user's mouth; flaring of a user's nostrils; movement of a user's cheeks; etc.

Additionally, as shown in FIG. 2A, first wearable audio device 103 further includes a first user interface 134 having at least one user input 136 used to obtain gesture data 130 related to plurality of gestures 132. It should be appreciated that, although illustrated in FIG. 2A as a plurality of touch capacitive sensors or a series of buttons or slideable switches, first user interface 134 and user input 136 can take any form capable of receiving a sensory input from a user, i.e., at least one user input 136 can be a signal generated by first sensor 128 such that a motion or a gesture of a plurality of gestures 132 discussed above may be made by the user and can serve as an input to first wearable audio device 102. FIGS. 2A-2B illustrate a right-side schematic view and a left-side schematic view, respectively, of first wearable audio device 102 having user first user interface 134 and first input(s) 136. It should be appreciated that first user interface 134 and first user input(s) 136 can be arranged on the right side or left side of first wearable audio device 102 in any order, pattern, or placement, and any conceivable combination thereof.

Figure 3:
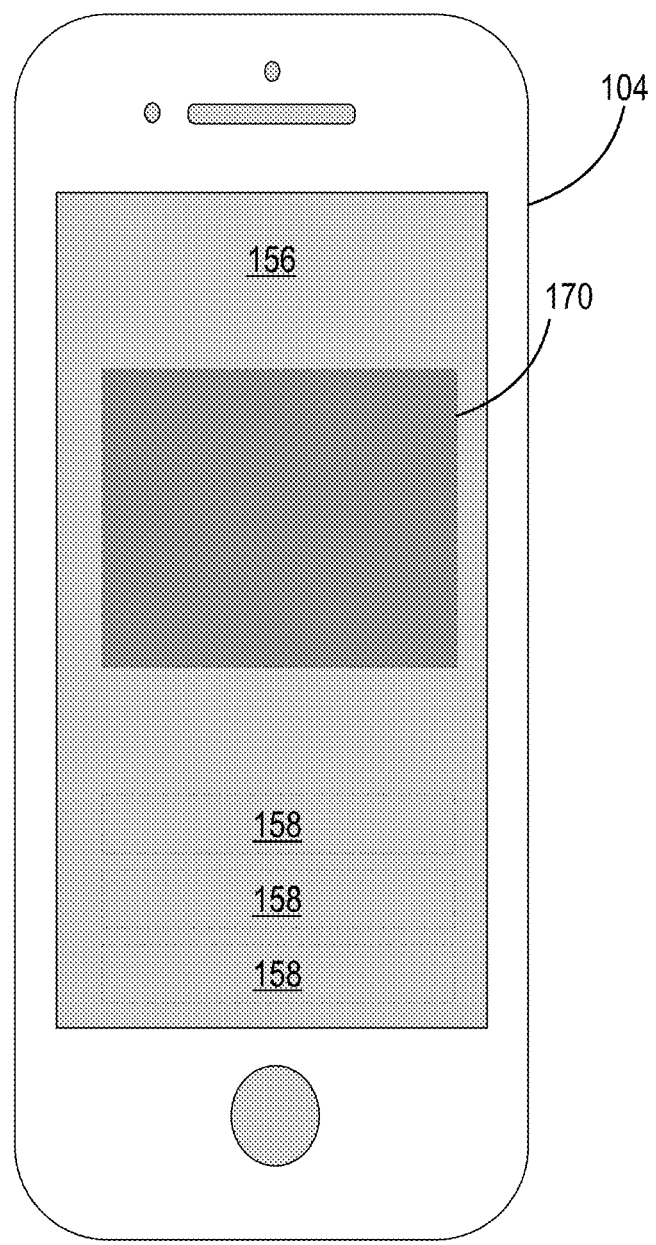
FIG. 3 is a schematic view of a peripheral device according to the present disclosure.

FIG. 3 illustrates a front schematic view of first peripheral device 104 according to the present disclosure. First peripheral device 104 includes a second communication module 138 (shown in FIG. 4B) arranged to send and/or received data, e.g., audio data or communication data (e.g., data sent and/or received in first connection 140 discussed below) which can include: data sent and/or received regarding the set of desired firmware capabilities 142, data sent and/or received regarding the first set of available firmware capabilities 144, and sensor data 118, via a second antenna 146 (shown in FIG. 4B). First peripheral device 104 further includes a second sensor 148 (shown in FIG. 4B) arranged on or within first peripheral device 104. Second sensor 148 can be selected from: a gyroscope, an accelerometer, a magnetometer, a touch-capacitive sensor, a piezo-electric sensor, a mechanical sensor, an audio receiver, a pressure or deformation sensor, an Electrooculography (EOG) sensor, an Electromyography (EMG) sensor, an Electrocardiogram (EKG/ECG) sensor, and an electrically active film. Second sensor 148 is arranged to obtain gesture data 130 (schematically shown in FIG. 4A) corresponding to at least one gesture of a plurality of gestures 132 discussed above with respect to first sensor 128.

It should be appreciated that second communication module 138 can be operatively connected to a second processor 150 (shown in FIG. 4A) and second memory 152 (shown in FIG. 4A), where the second processor 150 and the second memory 152 are operatively arranged to execute and store, respectively, a second set of non-transitory computer-readable instructions 154 (shown in FIG. 4A). It should also be appreciated that, although not illustrated, first peripheral device 104 may include a battery or other power source capable of providing electrical power to the various electronic components discussed above. Second set of non-transitory computer-readable instructions 154 may include instructions related to a software application, e.g., first software application 114 (discussed below).

Furthermore, first peripheral device 104 can include a second user interface 156 having at least one second user input 158. Although illustrated as a set of touch capacitive sensors located on a touch-screen display of first peripheral device 104, it should be appreciated that any type of user input, for example, a mechanical input or button may be utilized. Additionally, second user input 158 can be a signal generated by second sensor 148, located on or within first peripheral device 104.

During an operating mode 159, system 100 is arranged to implement, via a computer program product, for example, using first software application 114, communications and data exchanges between the first wearable audio device 102 and the first peripheral device 104. These exchanges may involve, for example, sending and receiving sensor data 118 between the first wearable audio device 102 and the first peripheral device 104, receiving gesture data 130 at the first wearable audio device 102 and/or the first peripheral device 104, exchanging information related to gesture data 130 between the first wearable audio device 102 and the first peripheral device 104, and receiving communications and data at the first wearable audio device 102, at least in part related to sensor data 118 and gesture data 130. These exchanges are only exemplary and other exchanges may take place during the operating mode 159.

In addition to storing the first set of non-transitory computer readable instructions 124, first memory 122 of first wearable audio device 102 may be arranged to store a first set of available firmware capabilities 144 of the first wearable audio device 102. In one example, the first set of available firmware capabilities 144 relates to available combinations of hardware components and/or hardware capabilities within first wearable audio device 102 and the set of instructions (known as firmware) stored, for example, in first memory 122 which are arranged to translate the machine level inputs of those components into variables, values, or events that can be used in higher level programming languages, e.g., within first software application 114. Similarly, in addition to storing the second set of non-transitory computer-readable instructions 154, second memory 152 of first peripheral device 104 is also arranged to store a set of desired firmware capabilities 142 of first software application 114. In one example, the set of desired firmware capabilities 142 corresponds to a list of desired combinations of firmware functions that first software application 114 intends to utilize during operation of first software application 114, i.e., when first software application 114 is executed on first peripheral device 104. In other words, first software application 114 may utilize a plurality of functions or method calls that utilize different hardware and firmware during operation. Therefore, the first software application 114 knows the functions that it wishes to utilize, where the functions correspond to available hardware and machine level (firmware) instructions of a device (e.g., first wearable audio device 102) capable of connecting to first peripheral device via, for example, first connection 140. It should be appreciated that the first set of available firmware capabilities 144 and the set of desired firmware capabilities 142 may further include component characteristic data, i.e., information relating to the particular functionality of each hardware component of a particular device. In one example, a desired firmware capability of the set of desired firmware capabilities 142 may be that a software application 114 intends to utilize gyroscopic sensor data at a sample rate between 50 Hz and 100 Hz.

As discussed herein, first peripheral device 104 may be arranged to store and execute a second set of non-transitory computer-readable instructions 154. Second set of non-transitory computer-readable instructions 154 may include, at least in part, software instructions related to the execution of a first software application, i.e., first software application 114. First software application 114 may be developed, i.e., drafted, compiled, executed, utilizing a plurality of software tools, i.e., pre-written portions of software code, that have been compiled into a Software Development Kit (SDK). The SDK may be arranged such that the pre-written portions of software code of the various software tools contain instructions that, when implemented in the creation of a software application, e.g., first software application 114, result in the communications and data exchanges discussed herein (i.e., at least the exchange of the first set of available firmware capabilities 144 of first wearable audio device 102 and the set of desired firmware capabilities 142 of first software application 114). It should be appreciated that first software application 114, as described throughout the present disclosure, is intended to be an Augmented Reality (AR) application capable of using sensor data from first sensor 128 and/or second sensor 148.

During operation of audio system 100, first wearable audio device 102 and first peripheral device 104 are arranged to broadcast, via first antenna 110 and second antenna 146, respectively, data 160 over a first protocol, i.e., first protocol 162. First protocol 162 can be selected from: a Bluetooth protocol, a Bluetooth Low-Energy (BLE) protocol, a ZigBee protocol, a Wi-Fi (IEEE 802.11) protocol, or any other protocol for broadcasting wireless information within an environment. In one example, first protocol 162 is Bluetooth Low-Energy (BLE) or Bluetooth Classic and is arranged to transmit data 160, i.e., audio data, communication data, or gesture data 130 gathered from first sensor 128 or second sensor 148, via a first profile 164. First profile 164 may be selected from: Advanced Audio Distribution Profile (A2DP), Attribute Profile (ATT), Audio/Video Remote Control Profile (AVRCP), Basic Imaging Profile (BIP), Basic Printing Profile (BPP), Common ISDN Access Profile (CIP), Cordless Telephony Profile (CTP), Device ID Profile (DIP), Dial-up Networking Profile (DUN), Fax Profile (FAX), File Transfer Profile (FTP), Generic Audio/Video Distribution Profile (GAVDP), Generic Access Profile (GAP), Generic Attribute Profile (GATT), Generic Object Exchange Profile (GOEP), Hard Copy Cable Replacement Profile (HCRP), Health Device Profile (HDP), Hands-Free Profile (HFP), Human Interface Device Profile (HID), Headset Profile (HSP), Intercom Profile (ICP), LAN Access Profile (LAP), Mesh Profile (MESH), Message Access Profile (MAP), OBject EXchange (OBEX), Object Push Profile (OPP), Personal Area Networking Profile (PAN), Phone Book Access Profile (PBAP, PBA), Proximity Profile (PXP), Serial Port Profile (SPP), Service Discovery Application Profile (SDAP), SIM Access Profile (SAP, SIM, rSAP), Synchronization Profile (SYNCH), Synchronization Markup Language Profile (SyncML), Video Distribution Profile (VDP), Wireless Application Protocol Bearer (WAPB), iAP (similar to SPP but only compatible with iOS), or any suitable Bluetooth Classic profile or Bluetooth Low-Energy profile that is capable of broadcasting and/or establishing a connection, i.e., first connection 140 discussed below. In one example, first protocol 162 is Bluetooth Low-Energy and first profile 164 is GATT.

While broadcasting, first wearable audio device 102 is arranged to send data 160 over first protocol 162 via first profile 164, where the data 160 includes the first set of available firmware capabilities 144 of first wearable audio device 102. Similarly, while broadcasting, first peripheral device 104 is arranged to send data 160 over first protocol 162 via first profile 164, where the data 160 includes the set of desired firmware capabilities 142 of first software application 114. Each device, i.e., first wearable audio device 102 and first peripheral device 104, is arranged to store, within first memory 122 and second memory 152, respectively, the first set of available firmware capabilities 144 and the set of desired firmware capabilities 142. It should be appreciated that only one device, i.e., first wearable audio device 102 and/or first peripheral device 104, may transfer the set of desired firmware capabilities 142 or the first set of available firmware capabilities 144, so that only one of the devices knows both sets of capabilities. Thereafter, first wearable audio device 102 and/or first peripheral device 104 are arranged to compare the first set of available firmware capabilities 144 and the set of desired firmware capabilities 142 to determine whether each firmware capability of the first set of available firmware capabilities 144 and each firmware capability of the set of desired firmware capabilities 142 match.

In one example, the first set of available firmware capabilities 144 and the set of desired firmware capabilities 142 match exactly, i.e., each firmware capability of the first set of available firmware capabilities 144 exists in the set of desired firmware capabilities 142 and utilizes the same component characteristics as described above. In this example, once the first set of available firmware capabilities 144 and the set of desired firmware capabilities 142 are determined to match, first wearable audio device 102 and/or first peripheral device 104 are arranged to determine from a set of firmware updates 166 whether a firmware update 168 (not shown in the figures) is available, i.e., whether the current firmware version installed and executable on first wearable audio device 102 is the latest firmware version available. This may include communicating via the internet to a remote server containing a listing of the current firmware versions available to first wearable audio device 102 and/or the set of firmware updates 166 and determining if the latest firmware version available matches the current firmware version running on first wearable audio device 102. If first wearable audio device 102 is running the latest version of firmware available for that particular first wearable audio device 102, then first wearable audio device 102 and first peripheral device 104 can proceed to establishing a more robust connection, i.e., first connection 140, for example, a paired connection via first protocol 162 capable of exchanging larger amounts of data 160 than previously broadcasted by first wearable audio device 102 and first peripheral device 104. Alternatively, a more robust connection, i.e., first connection 140, for example, a paired connection via first protocol 162 capable of exchanging larger amounts of data 160, may have already been established prior to broadcasting data regarding device capabilities. If the first wearable audio device 102 is not running the latest available firmware version, first wearable audio device 102 and/or first peripheral device 104 may prompt, via an output 170, the user of the first wearable audio device 102 and/or the first peripheral device 104, that first wearable audio device 102 is not running the latest firmware version, an update 168 (not shown in the figures) is available, and that they should begin installing the update 168. After the update 168 is successfully installed, first peripheral device 104 and first wearable audio device 102 may proceed to establish first connection 140 as discussed above, if the first connection 140 has not already been established.

In one example, the first set of available firmware capabilities 144 and the set of desired firmware capabilities 142 do not match, and audio system 100 is arranged to revert to a fallback state 172, which is part of operating mode 159. In fallback state 172, first wearable audio device 102 and/or first peripheral device 104 have determined that first wearable audio device 102 does not have the firmware capabilities, i.e., each capability of the first set of available firmware capabilities 144 required to allow first software application 114 to utilize all of the firmware capabilities of the set of desired firmware capabilities 142 of first software application 114. In this example, first wearable audio device 102 and/or first peripheral device 104 are arranged to determine from the set of firmware updates 166 whether a firmware update 168 is available, i.e., whether the current firmware version installed and executable on first wearable audio device 102 is the latest firmware version available. This may include communicating via the internet to a remote server containing a listing of the latest firmware versions available to first wearable audio device 102 and determining if the latest firmware version available matches the current firmware version running on first wearable audio device 102. If first wearable audio device 102 is not running the latest version of firmware available for that particular first wearable audio device 102, and an update 168 is available, the user will be notified, via output 170, that first wearable audio device 102 has an available update and that the update should be applied before attempting to utilize first software application 114. The user may then select to perform the update 168 to the latest version of firmware for the first wearable audio device 102. Optionally, after the update 168 is successfully completed, the first set of available firmware capabilities 144 and set of desired firmware capabilities 142 are re-broadcasted and compared again. If the comparison between the latest version of available firmware capabilities and the set of desired capabilities 142 do not match, first software application 114 may be arranged to prompt the user with an option to revert to fallback state 172. It should be appreciated that the first set of available firmware capabilities 144 and set of desired firmware capabilities 142 may already be known by the first wearable audio device 102 and/or first peripheral device 104, and it may not be necessary to a re-broadcast and compare the capabilities again. If no update is available, or the set of firmware updates 166 does not provide the set of desired firmware capabilities 142, first software application 114 is arranged to send an output 170 to, e.g., first wearable audio device 102 and/or first peripheral device 104, alerting the user that no update is available but that first software application 114 may be capable of functioning in fallback state 172 described below.

Fallback state 172 may be utilized if one or more desired capabilities of the set of desired capabilities 142 do not match exactly with the first set of available firmware capabilities 144. Fallback state 172 refers to a state where the user may elect to continue running first software application 114 where at least one desired firmware capability of the set of desired firmware capabilities 142 does not match exactly within the first set of available firmware capabilities 144, and fallback state 172 instead relies on a similar capability or functionality that will still allow the software application 114 to function but not to the degree or quality originally intended. For example, the set of desired firmware capabilities 142 may include an intent by the first software application 114 to utilize gyroscopic sensor data at a particular sample rate within first software application 114. First peripheral device 104 may broadcast, via second antenna 146 and over first protocol 162, that at least one of the desired firmware capabilities of the set of desired firmware capabilities 142 includes gyroscopic sensor data having a specific component characteristic, e.g., utilizing a gyroscopic sensor with a sample rate of 100 Hz. First wearable audio device 102 may broadcast, via first antenna 110 over first protocol 162, the first set of available firmware capabilities 144, where the first set of available firmware capabilities 144 includes the ability to utilize a gyroscopic sensor, however the component characteristic of the gyroscopic sensor available within first wearable audio device 102 is a 50 Hz sample rate. The user may then be notified, via output 170 sent to the first user interface 134 of first wearable audio device 102 or second user interface 156 of first peripheral device 104, that the first wearable audio device 102 lacks the ability to operate at the desired firmware capacity, i.e., can only perform at a 50 Hz sample rate and not a 100 Hz sample rate. The user may then choose, via the second user interface 156, to enter fallback state 172 where first software application 114 can acknowledge that it can still utilize the available gyroscopic sensor at the lower sample rate, i.e., 50 Hz. The first software application 114 can further notify the user that the use of the first software application may be restricted because of the need to function in this fallback state 172. In other words, a disclaimer may be provided on the second user interface 156 of the first peripheral device 104 which indicates that the quality of the user experience of audio system 100 may be limited or modified because of the limited capabilities of the first wearable audio device 102. Alternatively, the system may enter the fallback state 172 without requiring user input via the second user interface 156, and the first software application 114 may further notify the user that the use of the first software application 114 may be restricted because of the need to function in this fallback state 172.

It should be appreciated that the mismatch between the set of desired firmware capabilities 142 of first software application 114 and the first set of available firmware capabilities 144 of first wearable audio device 102 could be more substantial than the example illustrated above. For example, the set of desired firmware capabilities 142 could include an intent to utilize gyroscopic sensor data while first wearable audio device 102 may not be capable of utilizing gyroscopic sensor data at all. In this example, it may be possible, while in the fallback state 172, to utilize other types of sensor data, e.g., accelerometer data and/or magnetometer data to function in place of gyroscopic sensor data. It should be appreciated that once the fallback state 172 has been initiated by the user, the first peripheral device 104 and the first wearable audio device 102 may proceed to establishing a more robust connection, i.e., first connection 140, for example, a paired connection via first protocol 162 capable of exchanging larger amounts of data 160 than previously broadcast by first wearable audio device 102 and first peripheral device 104, if the first connection 140 has not already been established.

In one example, the first set of available firmware capabilities 144 and the set of desired firmware capabilities 142 do not match, and audio system 100 is arranged to revert to a cooperative state 174, which is part of operating mode 159.

In the cooperative state 174, first wearable audio device 102 and/or first peripheral device 104 have determined that first wearable audio device 102 does not have the available firmware capabilities required to allow first software application 114 to utilize all of the firmware capabilities of the set of desired firmware capabilities 142 of the first software application 114. For example, as discussed above, it may be determined that the set of desired firmware capabilities 142 includes an intent to use gyroscopic sensor data at a sample rate of 100 Hz. After comparison with the first set of available firmware capabilities 144 of first wearable audio device 102, before and/or after a potential update 168 (not shown in the figures), it may be determined that the set of desired firmware capabilities 142 and the first set of available firmware capabilities 144 do not match. Audio system 100 may revert to a cooperative state 174, where first software application 114 is arranged to substitute the missing available firmware capabilities with, e.g., different types of sensor data obtainable through use of the second sensor 148 of the first peripheral device 104, i.e., from a second set of available firmware capabilities 176. In the example described above, where the set of desired firmware capabilities 142 includes an intent to use gyroscopic sensor data at a sample rate of 100 Hz and where it is determined through comparison that the first wearable audio device 102 is not capable of utilizing gyroscopic sensor data (or at least not capable of utilizing gyroscopic sensor data at the required sample rate), first software application 114 may instead utilize gyroscopic sensor data from second sensor 148 of first peripheral device 104 at the required sample rate, i.e., 100 Hz. In other words, in this cooperative state 174, if a comparison between the set of desired firmware capabilities 142 and the second set of available firmware capabilities 176 results in a match (or second set of available firmware capabilities 176 includes at least one capability that is not included within the first set of available firmware capabilities 144) sensor data from either first sensor 128 and/or second sensor 148 may be utilized by first software application 114. In this cooperative state 174, a disclaimer may be provided on the second user interface 156 of the first peripheral device 104 which indicates that the quality of the user experience of audio system 100 may be limited or modified because of the limited capabilities of the first wearable audio device 102. It should be appreciated that once the cooperative state 174 has been initiated by the user, the first peripheral device 104 and the first wearable audio device 102 may proceed to establishing a more robust connection, i.e., first connection 140, for example, a paired connection via first protocol 162 capable of exchanging larger amounts of data 160 than previously broadcast by first wearable audio device 102 and first peripheral device 104, if the first connection 140 has not already been established.

In another example, as illustrated in FIG. 5, the SDK provided and utilized by the developer or programmer for use in the creation or generation of first software application 114 may contain software tools and instructions that provide a gesture subscription service. In this example, each method or function provided by the SDK utilizes a plurality of device-agnostic gesture variables 178 which can be utilized within first software application 114 in place of gesture variables that are specific to a particular gesture. Plurality of device-agnostic gesture variables 178 includes: an Augmented Reality (AR) input variable 180, an affirmative input variable 182, and a negative input variable 184. The affirmative input variable 182 may be designed to correspond with situations where the first software application 114 needs to receive an affirmative response, for example, corresponding to a "yes," through a gesture, such as, for example, a head nod 190. The negative input variable 184 may be designed to correspond with situations where the first software application 114 needs to receive an negative response, for example, corresponding to a "no," through a gesture, such as, for example, a head shake 192. The Augmented Reality (AR) input variable 180 may be designed to correspond with situations where the first software application 114 needs to receive a generic input through a gesture, such as, for example, a double tap gesture 186 or a touch and hold gesture 188, where the first software application monitors for the input and waits for the input before performing additional functions. Each device-agnostic gesture variable of plurality of device-agnostic gesture variables 178 may be assigned to one or more specific gesture values of plurality of specific gesture values 126 for a specific gesture within, for example, first software application 114. Plurality of specific gesture values 126 includes: a double tap 186, touch and hold 188, head nod 190, and head shake 192. These specific gestures are only exemplary and other gestures may be included in the plurality of gesture values 126. Through the gesture subscription service discussed herein, these or any number of specific gesture values or variables of plurality of gestures 126 may be assigned to, or the programmer may subscribe to utilizing, via software tools made available in the SDK, device-agnostic variables of a plurality of device-agnostic gesture variables 178 in first software application 114. Additionally, the programmer may then assign specific gesture variables or events to these device-agnostic variables such that any number or combination of gestures can be utilized as an AR input variable 180, an affirmative input variable 182, or a negative input variable 184.

This system may provide advantages over systems that require first software application to utilize calls or events that are specific to a particular gesture value of plurality of gesture values 126. For example, without the gesture subscription service described herein, first software application 114 may have been programmed to monitor for a particular gesture, for example a double-tap 186 on first user interface 134 of first wearable audio device 102. Until a double-tap gesture 186 is initiated, the application or program may not perform any additional functions. Accordingly, the software application is arranged to wait for this specific gesture to occur before taking additional action. The gesture subscription service described herein enables the software application to have the flexibility to accept multiple specific gestures (depending on the specific gestures that are supported by a connected wearable audio device) as an input to the software application.

In one example, as illustrated in FIG. 5, the gestures double-tap 186 and touch and hold 188 can be assigned, via the gesture subscription service, to AR input variable 180 of the plurality of device-agnostic gesture variables 178, the gesture head nod 190 can be assigned to the affirmative input variable 182 of the plurality of device-agnostic gesture variables 178, and the gesture head shake 192 can be assigned to the negative input variable 184 of the plurality of device-agnostic gesture variables 178. In this example, a programmer can generate a software application, e.g., first software application 114, that utilizes the device-agnostic variables throughout the software code to handle events and actions, while leaving open the possibility to easily change which gesture variable is associated with particular actions. For example, in the event that a particular device, i.e., first wearable audio device 102, does not support the desired gesture required by first software application 114 (due to, for example, lack of hardware to support the particular gesture or insufficient firmware capabilities), the program may allow for other gestures to be used as an AR input variable 180, an affirmative input variable 182, or a negative input variable 184, in place of the missing gesture.

As an example, a first software application 114 may include a desired firmware capability, among the set of desired firmware capabilities 142, associated with the gesture double-tap 186. However, first wearable audio device 102 may not have the firmware and/or hardware capabilities associated with the gesture double-tap 186 and may instead only include firmware and/or hardware capabilities associated with the gesture touch and hold 188. As first software application 114 has mapped both the gesture double-tap 186 and the gesture touch and hold 188 to the AR input 180, the first software application 114 can utilize the touch and hold gesture 188 in place of the double tap gesture 186 for any AR input gesture. This allows applications to communicate with a number of different wearable audio devices with different firmware and/or hardware capabilities without disrupting the functionality of the first software application 114.

Figure 6:
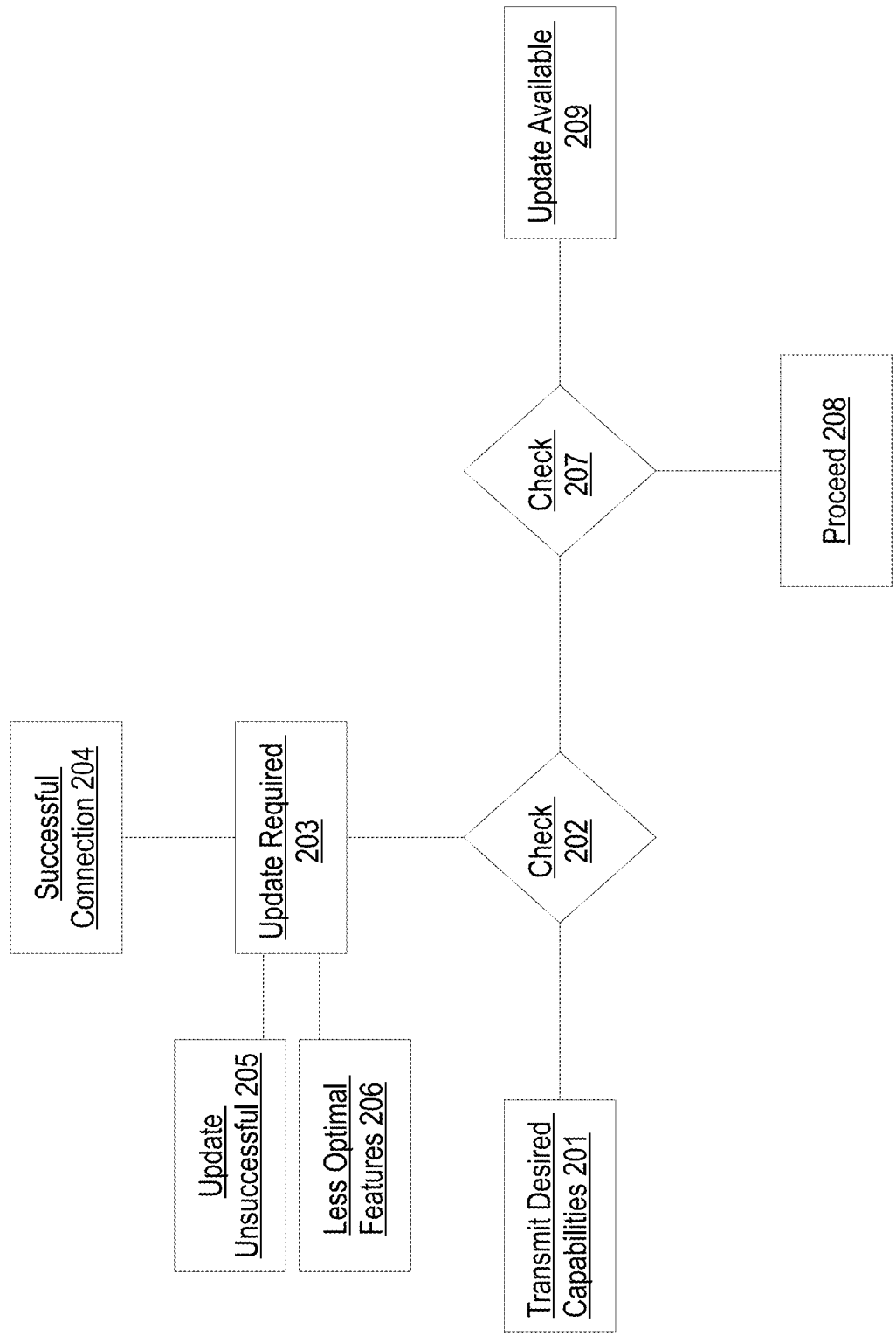
FIG. 6 illustrates steps in the process of checking firmware capabilities.

FIG. 6 illustrates steps in the process of checking firmware capabilities between a wearable audio device and a first software application running on a peripheral device. The first software application 114, operable on first peripheral device 104, may broadcast or transmit, via the first protocol 162 and first profile 164, its desired firmware capabilities 112, as illustrated in box 201. The first peripheral device 104 may check whether the first software application 114 would like to use capabilities that are not provided by the currently loaded firmware of the first wearable audio device 102, as shown in box 202. If the first software application 114 requests capabilities that are not included among the first set of the available firmware capabilities 144 of the first wearable audio device 102, and an update 168 is available, the user may be prompted, for example, via second user interface 156, that an update is available/required (shown in box 203). If the update is successful (shown in box 204), and the update contains the firmware capabilities desired by first software application 114, then the user can utilize first software application 114 as intended. If the update is unsuccessful, the user may receive an error notification, (for example, displayed on the second user interface 156 of first peripheral device 104), illustrating that the update attempt was unsuccessful (shown in box 205). The user (or first software application) may elect to continue without the required firmware but may be prompted with an additional notification that the user will not be able to take advantage of various features of the first software application 114 (shown in box 206). Even if every desired firmware capability of the set of desired firmware capabilities 142 of the first software application 114 is included among the first set of available firmware capabilities 144, the user may still be prompted, for example via second user interface 156, to check for firmware updates (shown in box 207). If the firmware on the first wearable audio device 102 is the latest version of the firmware, then no update can be made, and the user may proceed to use the first software application 114 on the first wearable audio device 102 (shown in box 208). If firmware updates 168 are available (shown in box 209), the user will be prompted to make those firmware updates.

Figure 7A:
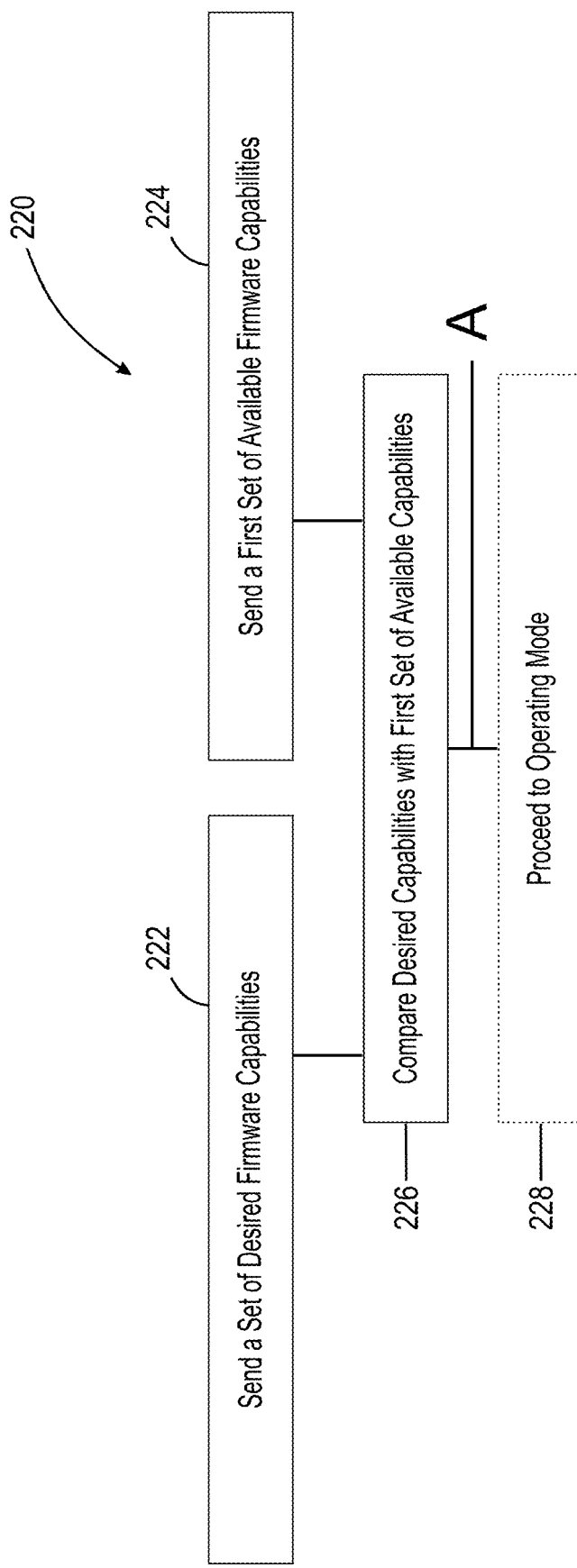
FIG. 7A and FIG. 7B are flowcharts illustrating the steps of a method according to the present disclosure.
Figure 7B:
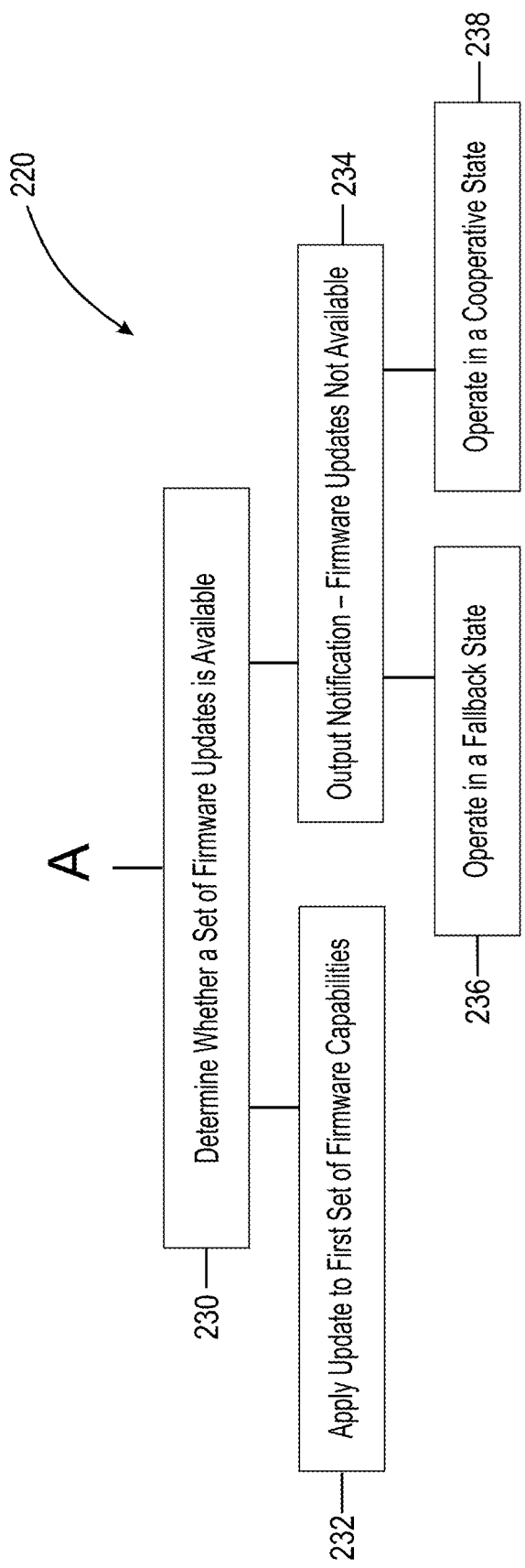

FIGS. 7A and 7B illustrate the steps of method 220 according to the present disclosure. Method 220 includes, for example, sending, via a first protocol 162, from a first peripheral device 104 to a first wearable audio device 102, a set of desired firmware capabilities 142 (step 222), or, sending, via the first protocol 162, from a first wearable audio device 102 to the first peripheral device 104, a first set of available firmware capabilities 144 of the first wearable audio device 102 (step 224); comparing the set of desired firmware capabilities 142 to the first set of available firmware capabilities 144 (step 226); and proceeding to an operating mode of the computer program product when the set of desired firmware capabilities 142 and the first set of available firmware capabilities 144 match (step 228). If the set of desired firmware capabilities 142 and the first set of available firmware capabilities 144 do not match, method 200 may further include: determining whether a set of firmware updates 166 for the first wearable audio device 102 is available (step 230); applying, if the set of firmware updates 166 for the first wearable audio device is available 102, an update from the set of firmware updates 166 to the first wearable audio device 102 at least in part based on the set of available updates for the first wearable audio device 102 (step 232). Additionally, if a set of non-transitory computer readable instructions determines that the set of firmware updates 166 for the first wearable audio device 102 is not available or that the set of firmware updates 166 do not provide the set of desired firmware capabilities 142, method 200 may further include: outputting a notification at the first peripheral device 104 or the first wearable audio device 102 that the set of firmware updates is not available (step 234); operating in a fallback state 172 if the set of desired firmware capabilities 142 and the first set of available firmware capabilities 144 do not match, the fallback state 172 arranged to utilize the first set of available firmware capabilities 144 of the first wearable audio device 102 (step 236); or, operating in a cooperative state 174 if the set of desired firmware capabilities 142 and the first set of available firmware capabilities 144 do not match, the cooperative state 174 arranged to utilize a second set of available firmware capabilities 176 of the first peripheral device 104 (step 238).

Figure 8:
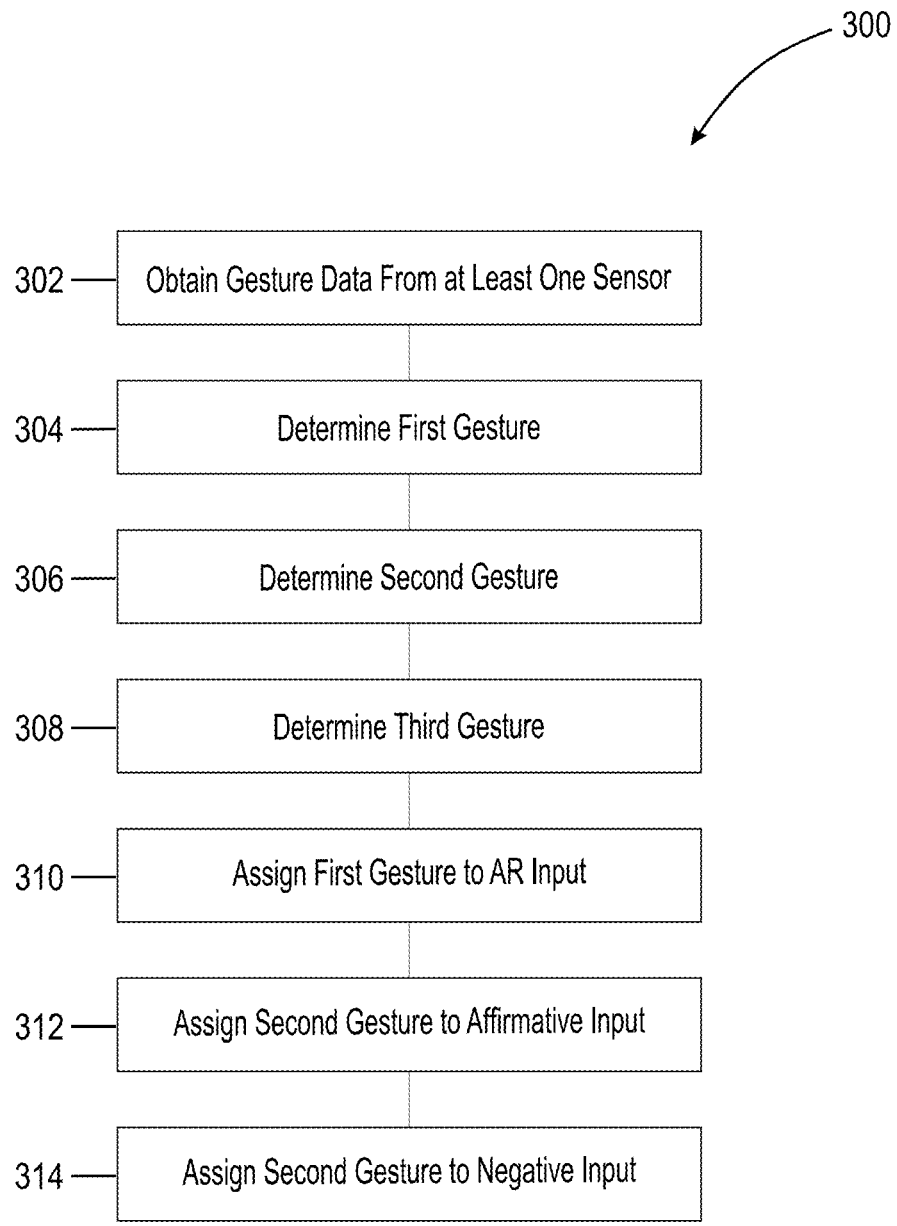
FIG. 8 is a flowchart illustrating the steps of a method according to the present disclosure.

FIG. 8 illustrates the steps of method 300 according to the present disclosure. Method 300 includes, for example, obtaining gesture data 130 from at least one sensor 128 of a first wearable audio device 102 (step 302); determining a first gesture from the gesture data 130 (step 304); determining a second gesture from the gesture data 130 (step 306); determining a third gesture from the gesture data 130 (step 308); assigning the first gesture to the AR input variable 180 (step 310) according to the gesture subscription service described herein; assigning the second gesture to the affirmative input variable 182 (step 312) according to the gesture subscription service described herein; and, assigning the third gesture to the negative input variable 184 (step 314) according to the gesture subscription service described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer program product comprising a set of non-transitory computer readable instructions stored on a memory and executable by a processor, the set of non-transitory computer readable instructions arranged to:
   obtain gesture data;
   determine first and second gesture from the gesture data; and,
   assign the first and second gestures to a gesture input variable required for executing a function on a software application running on a first peripheral device, wherein the gesture input variable comprises at least one of an Augmented Reality (AR) input variable, an affirmative input variable, or a negative input variable;
   send, via a first protocol, from the first peripheral device to a first wearable audio device, a set of desired firmware or hardware capabilities comprising a desired firmware or hardware capability associated with the first gesture, or, send, via the first protocol, from the first wearable audio device to the first peripheral device, a set of available firmware or hardware capabilities comprising an available firmware or hardware capability associated with the second gesture;
   compare the set of desired firmware or hardware capabilities to the set of available firmware or hardware capabilities; and
   when the first wearable audio device does not support the desired firmware or hardware capability associated with the first gesture, execute the function on the software application using the second gesture instead of the first gesture as the gesture input variable.

2. The computer program product of claim 1, wherein the set of non-transitory computer readable instructions are arranged to:
   assign the first gesture to the AR input variable and the affirmative input variable.

3. The computer program product of claim 1, wherein the set of non-transitory computer readable instructions are arranged to:
   assign the first gesture to the AR input variable and the negative input variable.

4. The computer program product of claim 1, wherein the set of non-transitory computer readable instructions are arranged to:
   determine the first gesture, the second gesture, and a third gesture, from the gesture data;
   assign the first gesture to the AR input variable;
   assign the second gesture to the affirmative input variable; and,
   assign the third gesture to the negative input variable.

5. The computer program product of claim 1, wherein the gesture data is obtained from at least one sensor of the first wearable audio device and the at least one sensor can be selected from: a gyroscope, an accelerometer, and a magnetometer.

6. The computer program product of claim 1, wherein the gesture data is obtained from at least one sensor of the first wearable audio device and the at least one sensor can be selected from: a piezo-electric sensor, a mechanical sensor, a pressure sensor, and a deformation sensor.

7. The computer program product of claim 1, wherein the gesture data is obtained from at least one sensor of the first wearable audio device and the at least one sensor can be selected from: an Electrooculography (EOG) sensor, an Electromyography (EMG) sensor, and an Electrocardiogram (EKG/ECG) sensor.

8. The computer program product of claim 1, wherein the first gesture is selected from: a swipe gesture, a tap gesture, a double-tap gesture, a head nod, a head shake, and a touch and hold gesture.

9. A method of assigning gestures to input variables, the method comprising:
   obtaining gesture data;
   determining first and second gestures from the gesture data;
   assigning the first and second gestures to a gesture input variable required for executing a function on a software application running on a first peripheral device, wherein the gesture input variable comprises at least one of an Augmented Reality (AR) input variable, an affirmative input variable, or a negative input variable;
   sending, via a first protocol, from the first peripheral device to a first wearable audio device, a set of desired firmware or hardware capabilities comprising a desired firmware or hardware capability associated with the first gesture, or, sending, via the first protocol, from the first wearable audio device to the first peripheral device, a set of available firmware or hardware capabilities comprising an available firmware or hardware capability associated with the second gesture;
   comparing the set of desired firmware or hardware capabilities to the set of available firmware or hardware capabilities; and
   when the first wearable audio device does not support the desired firmware or hardware capability associated with the first gesture, executing the function on the software application using the second gesture instead of the first gesture as the gesture input variable.

10. The method of claim 9, further comprising:
    assigning the first gesture to the AR input variable and the affirmative input variable.

11. The method of claim 9, further comprising:
    assigning the first gesture to the AR input variable and the negative input variable.

12. The method of claim 9, further comprising:
    determining the first gesture, the second gesture, and a third gesture, from the gesture data;
    assigning the first gesture to the AR input variable;
    assigning the second gesture to the affirmative input variable; and,
    assigning the third gesture to the negative input variable.

13. The method of claim 9, wherein the gesture data is obtained from at least one sensor of the first wearable audio device and the at least one sensor can be selected from: a gyroscope, an accelerometer, and a magnetometer.

14. The method of claim 9, wherein the gesture data is obtained from at least one sensor of the first wearable audio device and the at least one sensor can be selected from: a piezo-electric sensor, a mechanical sensor, a pressure sensor, and a deformation sensor.

15. The method of claim 9, wherein the gesture data is obtained from at least one sensor of the first wearable audio device and the at least one sensor can be selected from: an Electrooculography (EOG) sensor, an Electromyography (EMG) sensor, and an Electrocardiogram (EKG/ECG) sensor.

16. The method of claim 9, wherein the first gesture is selected from: a swipe gesture, a tap gesture, a double-tap gesture, a head nod, a head shake, and a touch and hold gesture.

\* \* \* \* \*